US010926363B2

(12) United States Patent
Moehlau et al.

(10) Patent No.: US 10,926,363 B2
(45) Date of Patent: Feb. 23, 2021

(54) NET FORGED SPIRAL BEVEL GEAR

(71) Applicant: American Axle & Manufacturing, Inc., Detroit, MI (US)

(72) Inventors: Curt Moehlau, Shelby Township, MI (US); Mohsen Kolivand, Rochester Hills, MI (US); Dale K. Benedict, Commerce Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 9 days.

(21) Appl. No.: 15/175,061

(22) Filed: Jun. 7, 2016

(65) Prior Publication Data

US 2016/0361784 A1 Dec. 15, 2016

Related U.S. Application Data

(60) Provisional application No. 62/175,586, filed on Jun. 15, 2015.

(51) Int. Cl.
*B23P 15/14* (2006.01)
*B23F 9/00* (2006.01)
(Continued)

(52) U.S. Cl.
CPC ............... *B23P 15/14* (2013.01); *B21K 1/305* (2013.01); *B23F 9/00* (2013.01); *B23F 19/025* (2013.01); *F16H 55/17* (2013.01)

(58) Field of Classification Search
CPC .......... B23F 9/00; B23F 9/02; B23F 19/0205; B23P 15/14; B21K 1/30; B21K 1/305
See application file for complete search history.

(56) References Cited

U.S. PATENT DOCUMENTS 4,420,962 A 12/1983 Peterson
4,798,077 A * 1/1989 Douglas ................ B21H 1/06
29/893.34
(Continued)

FOREIGN PATENT DOCUMENTS

CN 102240774 A 11/2011
CN 102441773 A 5/2012
(Continued)

OTHER PUBLICATIONS

Communication dated Dec. 28, 2017, from the European International Search Report for corresponding International application PCT/US2016/036596, filed Jun. 15, 2015.
(Continued)

*Primary Examiner* — Christopher J Besler
(74) *Attorney, Agent, or Firm* — Burris Law, PLLC

(57) ABSTRACT

A method that includes: providing a blank; heating the blank; forging the heated blank to form a forged gear having a plurality of spiral bevel gear teeth; machining the forged gear to a predetermined thickness while locating off of the plurality of gear teeth to form a green machined forged gear; rotationally and axially engaging a die to the gear teeth of the green machined forged gear to induce plastic flow in the gear teeth to form an intermediate gear in which the plurality of gear teeth conform to a predetermined tooth form; heat-treating the intermediate gear to form a hardened intermediate gear; and lapping the plurality of gear teeth of the hardened intermediate gear with a spiral bevel pinion gear; wherein the plurality of gear teeth are not machined in a chip-producing machining operation before the plurality of gear teeth are lapped.

10 Claims, 4 Drawing Sheets

(51) Int. Cl.
  *B23F 19/02* (2006.01)
  *B21K 1/30* (2006.01)
  *F16H 55/17* (2006.01)

(56) References Cited

U.S. PATENT DOCUMENTS

| | | | |
|---|---|---|---|
| 4,939,829 A | | 7/1990 | Maki et al. |
| 5,718,774 A | * | 2/1998 | Tukamoto ............... B21K 1/30 |
| | | | 148/219 |
| 5,946,963 A | * | 9/1999 | Suzuki ................... B21K 1/30 |
| | | | 29/893.34 |
| 7,337,647 B2 | * | 3/2008 | Shimomura ............ B21K 1/30 |
| | | | 29/893.34 |
| 8,047,092 B2 | * | 11/2011 | Suzuki ............... F16H 55/0846 |
| | | | 74/423 |
| 2001/0001165 A1 | * | 5/2001 | Hasegawa ............... B21K 1/30 |
| | | | 29/34 R |
| 2004/0093729 A1 | * | 5/2004 | Roeske .................... B21J 13/08 |
| | | | 29/893.3 |
| 2007/0144289 A1 | * | 6/2007 | O-Oka .................... B21K 1/30 |
| | | | 74/339 |
| 2014/0360018 A1 | | 12/2014 | Chavdar et al. |
| 2015/0111470 A1 | * | 4/2015 | McGlasson ............. B23F 19/02 |
| | | | 451/5 |

FOREIGN PATENT DOCUMENTS

| | | |
|---|---|---|
| EP | 1068912 A2 | 1/2001 |
| EP | 1462679 A2 | 9/2004 |
| WO | WO-2002/078876 A1 | 10/2002 |

OTHER PUBLICATIONS

Chinese Office Action dated Sep. 21, 2018.
Search Report for European Application No. EP16812168.9 dated Jan. 25, 2019 based on PCT/US2016/036596.

* cited by examiner

NET FORGED SPIRAL BEVEL GEAR

CROSS-REFERENCE TO RELATED APPLICATIONS

This application claims the benefit of U.S. Provisional Patent Application No. 62/175,586 filed Jun. 15, 2015, the disclosure of which is incorporated by reference as if fully set forth in detail herein.

FIELD

The present disclosure relates to a net forged spiral bevel gear.

BACKGROUND

This section provides background information related to the present disclosure which is not necessarily prior art.

It is known in the art to net-forge the gear teeth of straight bevel gears. As compared with a similar machined straight bevel gear, net-forging the teeth of a straight bevel gear can provide increased strength and wear properties of the gear teeth, can reduce the amount of material that is needed to form the gear, and can significantly reduce the amount of time and labor that is needed to form the gear.

Despite these advantages, we are unaware of successful net-forging of the teeth of a spiral bevel gear, and in particular, a hypoid (spiral bevel) gear. One problem associated with the net-forging of a spiral bevel gear is related to the curving of the gear teeth along the face width from the toe of the tooth to the heel of the tooth. We have not found it possible to net-form the teeth of a spiral bevel gear in a single die stroke. In this regard, we have found that the spiral bevel gear teeth experience distortion so that the spiral bevel gear teeth deviate from a desired tooth form. While the deviations that we have experienced are relatively small, they are nevertheless large enough so that additional machining of the gear teeth is required. The post-forging machining of the gear teeth is relatively expensive and time consuming. Accordingly, there remains a need in the art for the net-forming of spiral bevel gear teeth.

SUMMARY

This section provides a general summary of the disclosure, and is not a comprehensive disclosure of its full scope or all of its features.

In one form, the present disclosure provides a process for manufacturing a spiral bevel gear. The process includes: providing a forging having a first side and a second side, the first side comprising a plurality of spiral bevel gear teeth; machining the second side of the forging to a predetermined distance from a portion of the spiral bevel gear teeth; coining the machined forging to form a coined gear; heat-treating the coined gear; and machining a portion of the of the heat-treated gear other than the spiral bevel gear teeth.

In another form, the present disclosure provides a process for manufacturing a gear. The process includes: providing a forging having a first side and a second side, the first side comprising a plurality of teeth; machining the second side of the forging to a predetermined distance from a portion of the teeth; and coining the machined forging to form a gear.

In still another form, the present disclosure provides a method that includes: providing a blank; heating the blank to a temperature that exceeds a predetermined forging temperature; forging the heated blank to form a forged gear having a plurality of spiral bevel gear teeth; machining the forged gear to a predetermined thickness while locating off of the plurality of spiral bevel gear teeth to form a green machined forged gear; rotationally and axially engaging a die to the spiral bevel gear teeth of the green machined forged gear to induce plastic flow in the spiral bevel gear teeth to form an intermediate gear in which the plurality of spiral bevel gear teeth conform to a predetermined tooth form; heat-treating the intermediate gear to form a hardened intermediate gear; and lapping the plurality of spiral bevel gear teeth of the hardened intermediate gear with a spiral bevel pinion gear; wherein the plurality of spiral bevel gear teeth are not machined in a chip-producing machining operation before the plurality of spiral bevel gear teeth are lapped.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 2:
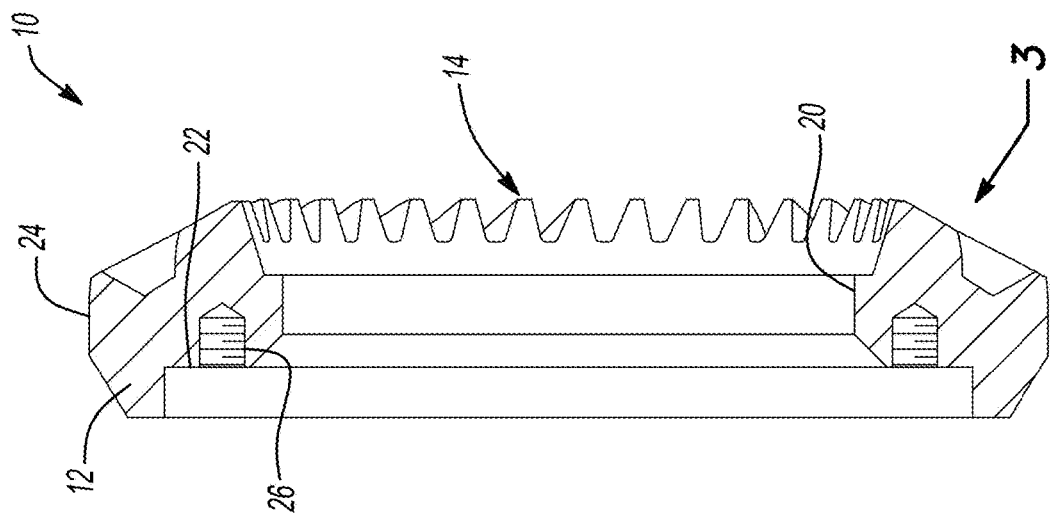
FIG. 2 is a section view taken along the line 2-2 of FIG. 1.
Figure 1:
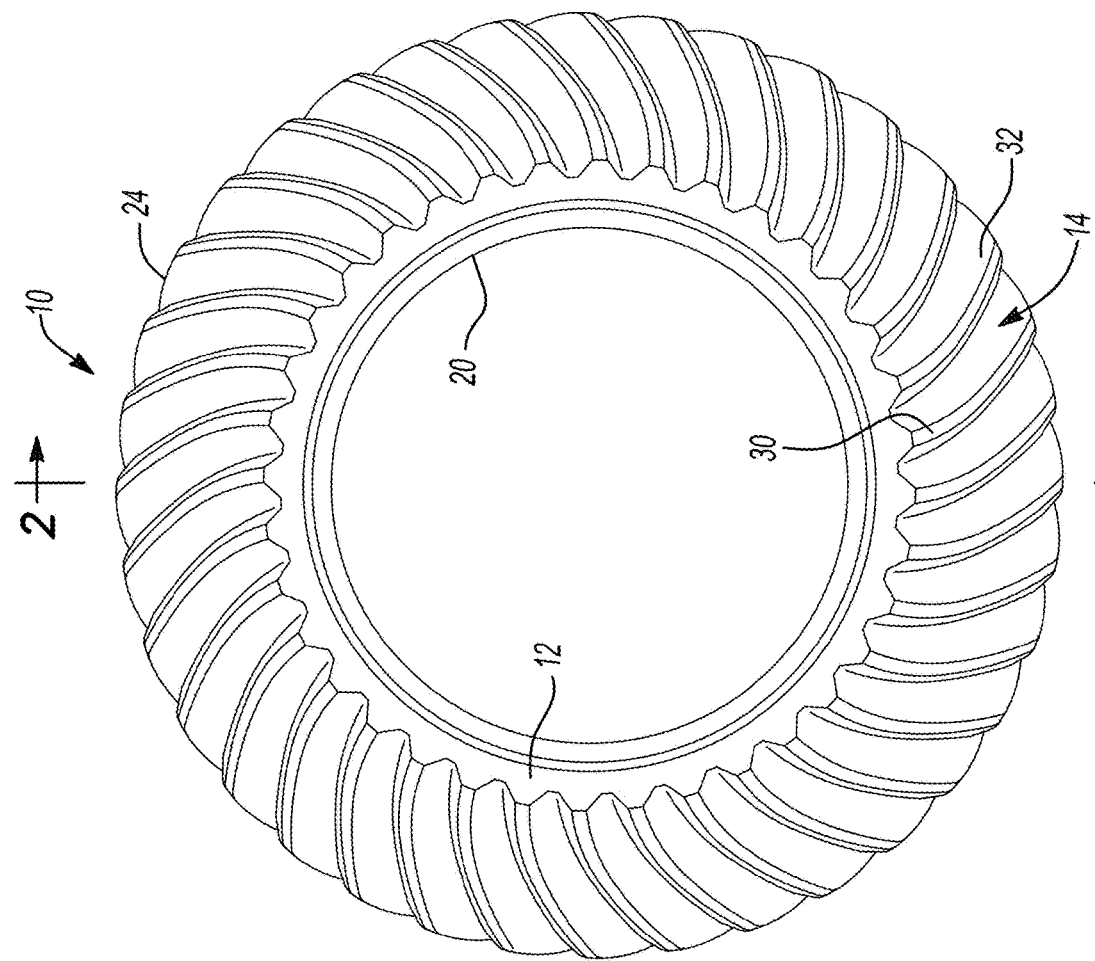
FIG. 1 is a top plan view of an exemplary spiral bevel gear constructed in accordance with the teachings of the present disclosure.

With reference to FIGS. 1 and 2, a spiral bevel gear constructed in accordance with the teachings of the present disclosure is generally indicated by reference numeral 10. The spiral bevel gear 10 can have a gear body 12 and a plurality of gear teeth 14 that can be coupled to and extend from a front side of the gear body 12. The gear body 12 can define a through-bore 20, an annular mounting flange 22 and an outer circumferential surface 24. The through-bore 20 can be configured to receive a shaft or differential case (not shown), while the annular mounting flange 22 can be configured to be abutted against a mating flange (not shown) on the differential case. In the example provided, a plurality of threaded apertures 26 are formed in the gear body 12 and spaced circumferentially about the annular mounting flange 22. The threaded apertures 26 are configured to threadably receive bolts (not shown) that are fitted through corresponding apertures (not shown) in the differential case to thereby secure the mating flange of the differential case to the gear body 12. It will be appreciated, however, that the teachings of the present disclosure have application to the construction of spiral bevel gears generally and as such, it will be understood that the discussion of the spiral bevel gear 10 in conjunction with a differential case is meant to be exemplary only and does not limit the scope of the disclosure. It will be further understood that various other means may be employed to secure the gear body 12 to a rotary shaft or body, including interference or press-fitting and welds.

Figure 3:
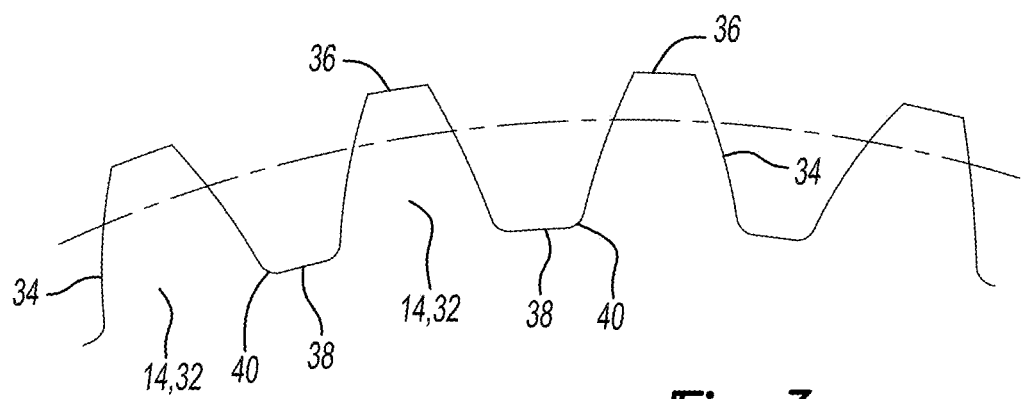
FIG. 3 is a view taken in the direction of arrow 3 shown in FIG. 2.
Figure 4:
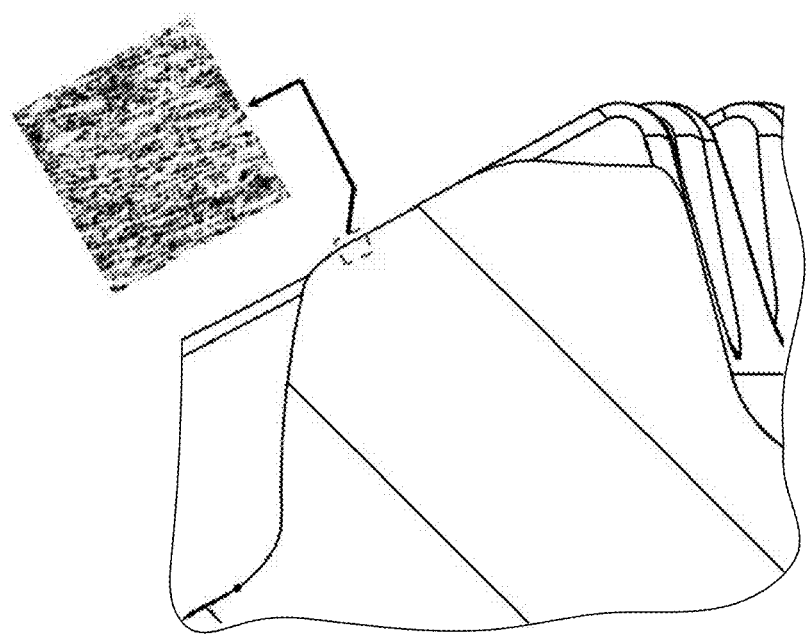
FIG. 4 is a sectional view of a portion of the spiral bevel gear of FIG. 1 illustrating the microstructure of the material that forms a portion of the exterior surface of the gear teeth of the spiral bevel gear.

With reference to FIGS. 1 and 3, the gear teeth 14 can be conventionally arranged about a pitch diameter (not specifically shown) and a pitch angle (not specifically shown). Each of the gear teeth 14 can be disposed along a mean spiral angle (not specifically shown) and can have a toe 30 at a radially inner end of the tooth, a heel 32 at a radially outer end of the tooth, a tooth profile 34, a top land 36, a bottom land 38, and a tooth fillet radius 40 that joins the bottom land 38 to the tooth profile 34. The gear teeth 14 can be configured for a desired hypoid offset. A configuration with a hypoid offset of zero produces a conventional spiral bevel gear, whereas a configuration with a non-zero hypoid offset produces a (spiral bevel) hypoid gear. With reference to FIG. 4, the tooth profile 34 of each of the gear teeth 14 has a microstructure that is composed of a plurality of grains, and wherein each of the grains at an exterior surface 42 of the portion of the gear tooth 14 that defines the tooth profile 34 is elongated in a manner that is approximately parallel to the exterior surface 42. As will be discussed in more detail below, the exterior surface 42 of the portion of the gear tooth 14 that forms the tooth profile 34 is initially formed in a forging operation, undergoes a coining operation, and is thereafter heat-treated and lapped.

Figure 5:
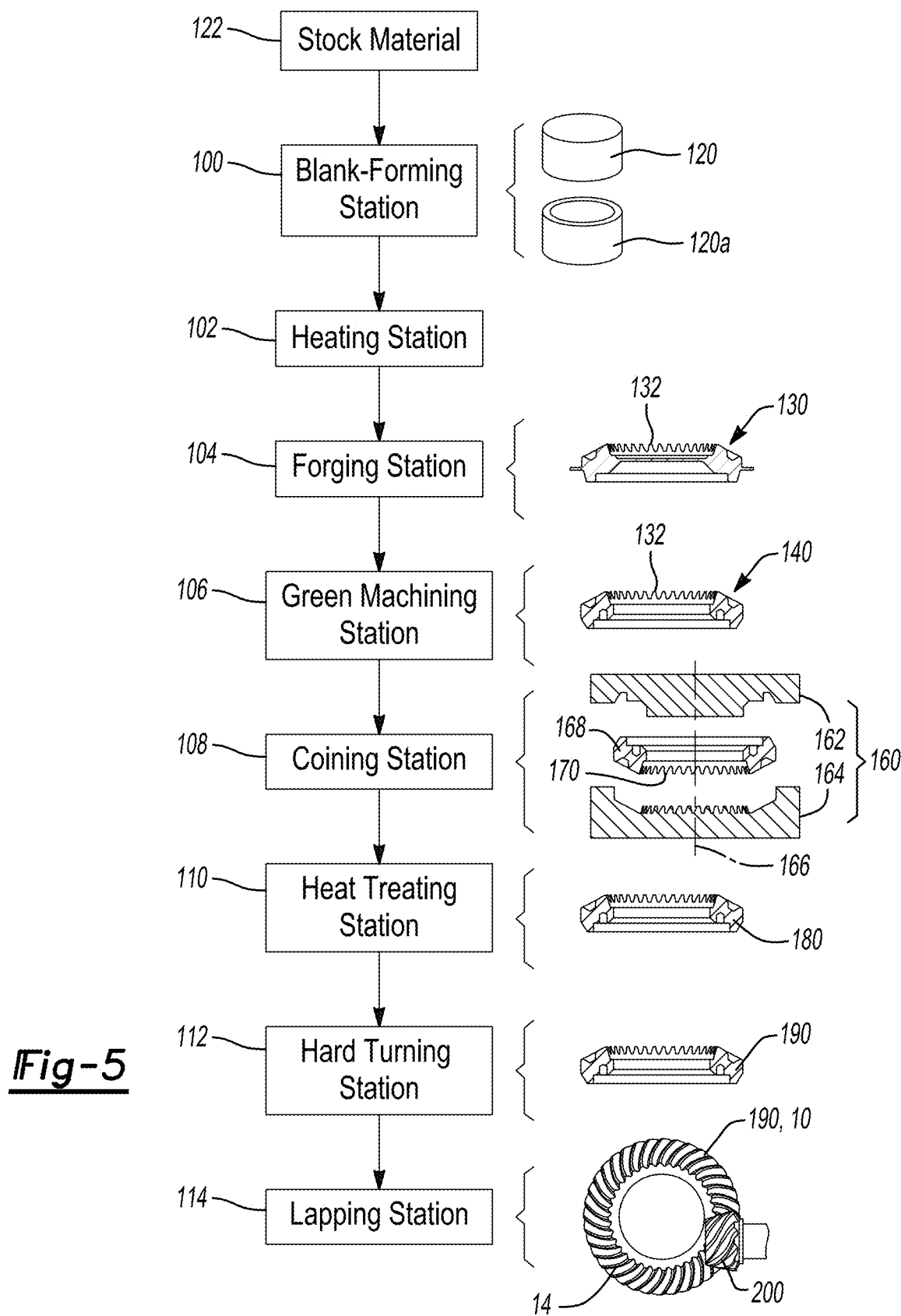
FIG. 5 is a schematic illustration of an exemplary system for manufacturing the spiral bevel gear of FIG. 1.

With reference to FIG. 5, a system for fabricating a spiral bevel gear in accordance with the teachings of the present disclosure is illustrated. The system includes a blank-forming station 100, a heating station 102, a forging station 104, a green machining station 106, a coining station 108, a heat treating station 110, a hard turning station 112 and a lapping station 114. Those of skill in the art will appreciate that the term "station" can comprise one or more machines and that the machines need not be disposed in close proximity to one another.

A method for forming a spiral bevel gear in accordance with the teachings of the present disclosure can include forming a blank 120 at the blank-forming station 100 from a length of stock material 122. The stock material 122 in the example provided is shaped as a solid cylinder so that the blank 120 is shaped as a round plinth. It will be appreciated, however, that the blank 120 could be shaped differently. For example, the stock material 122 could have a tubular shape and the blank 120a could be shaped as an annular plinth. Any desired method could be employed to sever the blank from the stock material, such as sawing.

The blank 120 can be pre-heated in the heating station 102 to a temperature that is greater than or equal to a desired forging temperature. Any suitable heater can be employed, including gas-fired or electric convection ovens or an induction heater.

Figure 6:
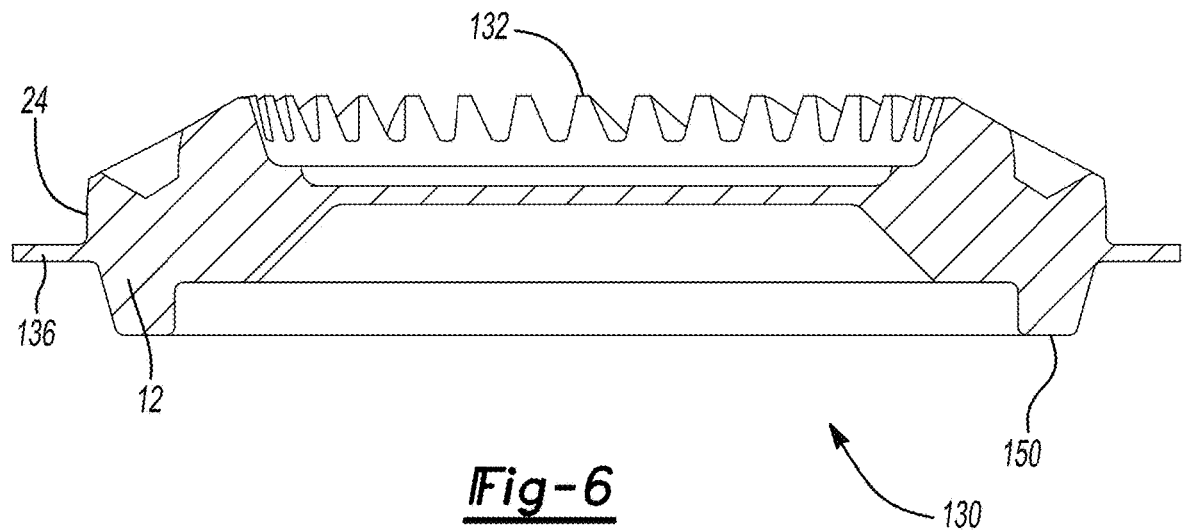
FIG. 6 is a section view of a forged gear that is formed at an intermediate step in the manufacture of the spiral bevel gear of FIG. 1.

With reference to FIGS. 5 and 6, the pre-heated blank (i.e., the blank 120 at a temperature that is greater than or equal to the desired forging temperature) can be forged at the forging station 104 to form a forged gear 130 having a plurality of spiral bevel gear teeth 132. It will be appreciated that the forging station 104 may comprise one or more tools, such as forging dies, and that the forged gear 130 may be formed in a single "hit" or forging operation or in multiple "hits" or forging operations that can be performed in one or more tools and which are configured to produce a variety of forge gear geometries. The forged gear 130 can be formed without the through-bore 20 (FIG. 1) and can include a circumferential flange 136 that is configured to receive flash or excess material. It will be appreciated that various elements of the forged gear 130 can be formed so as to be sized and shaped in a manner that corresponds to the sizing and/or shaping of those elements in the spiral bevel gear 10 (FIG. 1). For example, a portion of the outer circumferential surface 24 of the gear body 12 can be net formed. We have found, however, that it is not possible to net-form the gear teeth 132 of the forged gear 130 with sufficient accuracy so that the gear teeth 132 conform to a desired tooth profile (within a relatively small tolerance window) so that no chip-forming machining processes (i.e., cutting, grinding, electro-discharge machining) are required after the forging operation.

Figure 7:
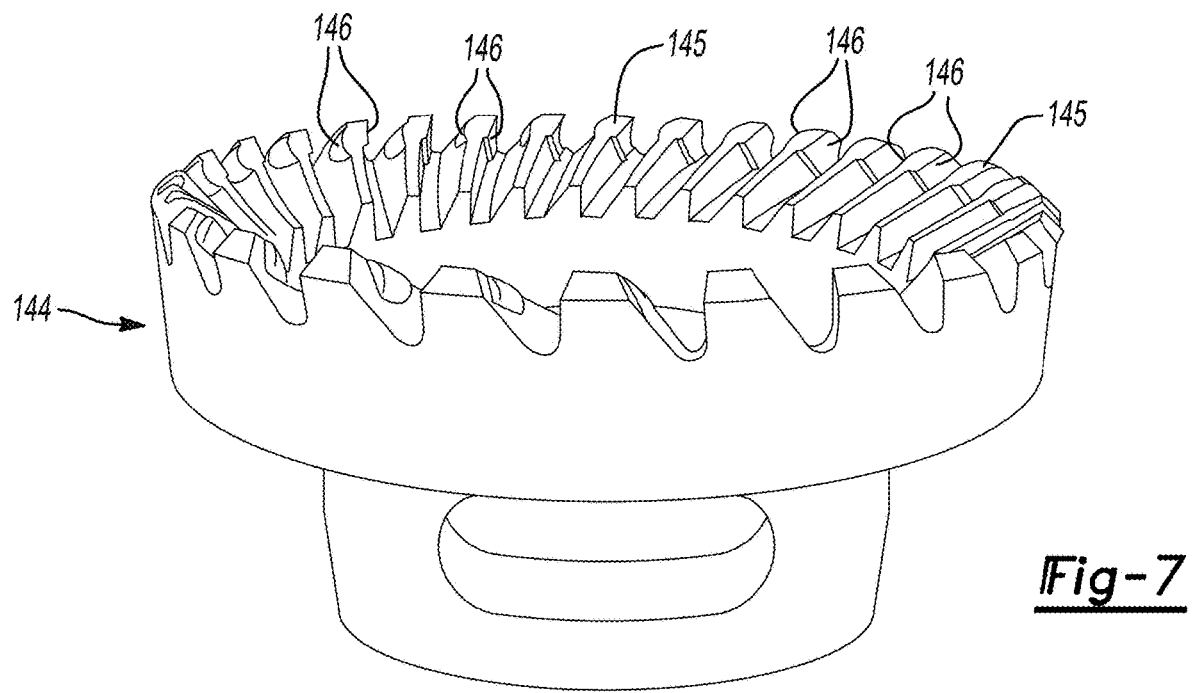
FIG. 7 is a perspective view of a fixture that is employed in another intermediate step in the manufacture of the spiral bevel gear of FIG. 1.

Optionally, the forged gear 130 can be "green machined" at the green machining station 106 to form a green machined forged gear 140. At a minimum, the green machining operation consists of machining the gear body 12 of the forged gear 130 to a predetermined thickness. In the example provided, the gear teeth 132 of the forged gear 130 are employed to locate the forged gear 130 relative to a fixture 144 (FIG. 7) and to establish a datum (not specifically shown) relative to the gear teeth 132 of the forged gear 130. In the example provided, the fixture 144 (FIG. 7) comprises a plurality of locators 145 (FIG. 7) and each of the locators 145 (FIG. 7) has a plurality of locating elements 146 (FIG. 7) that is configured to engage a pair of flanks of the gear teeth 132. More specifically, each of the locators 145 (FIG. 7) is disposed between a "coast" side or flank of a first one of an adjacent pair of the gear teeth 132 and a "drive" side or flank of a second one of the adjacent pair of gear teeth 132. The forged gear 130 and the fixture 144 (FIG. 7) can be driven (axially) together, for example via gravity or a ram, to ensure contact between a plurality of the locating elements 146 (FIG. 7) and the gear teeth 132 of the forged gear 130. Clamps (not shown) can be employed to secure the forged gear 130 to the fixture 144 (FIG. 7). The clamps can be employed to grip on the outer circumferential surface 24 and/or a rear side 150 (FIG. 6) of the forged gear 130 can be machined so that the thickness of the resulting green machined forged gear 140 corresponds to the predetermined thickness (i.e., a rear surface of the rear side 150 is spaced apart from the datum that is established by the meshing of the gear teeth 132 with the locators 145 (FIG. 7) of the fixture 144 (FIG. 7)). If desired, other surfaces of the forged gear 130 can be machined, except for the tooth profile, the bottom land and the tooth fillet radius of the gear teeth 132. In the example provided, the circumferential flange 136 is trimmed off, the threaded apertures 26 (FIG. 2) are drilled and tapped, and a bore is formed in the gear body 12. The bore is sized somewhat smaller than the through-bore 20 (FIG. 2) and provides machining stock for a hard turning operation that is described in more detail below. In the particular example provided, the bore in the gear body 12 of the green machined forged gear 140 is formed by blanking, but it will be appreciated that the bore could be formed by a drilling or boring operation.

The green machined forged gear 140 (or the forged gear 130, if the forged gear 130 is not green machined) can undergo a coining operation at the coining station 108. If desired, a lubricant, such as zinc phosphate, can be applied to the green machined forged gear 140 (or the forged gear 130, if the forged gear 130 is not green machined) at or prior to the coining station 108. The green machined forged gear 140 can be loaded between in a coining die 160 having upper and lower die members 162 and 164, respectively. At least one of the upper and lower die members 162 and 164 can be moved along a coining axis 166 and optionally rotationally about the coining axis 166 to engage the gear teeth 132 of the green machined forged gear 140 and induce plastic flow in the gear teeth 132 of the green machined forged gear 140 to form an intermediate gear 168 having (spiral bevel) gear teeth 170 that conform to the desired tooth profile. The coining die 160 is configured to cold-work the gear teeth 132 of the green machined forged gear 130 so that they conform to the desired tooth profile with sufficient accuracy (i.e., so that the gear teeth 170 of the intermediate gear can be shaped to a finished form in a lapping operation without having to undergo a chip-producing machining operation, such as milling, grinding or electro-discharge machining).

The intermediate gear 168 can be heat-treated at the heat treating station 110 to form a hardened intermediate gear 180. The hardened intermediate gear 180 can be hard turned at the hard turning station 112 to form a hard-turned intermediate gear 190 in which the through-bore 20 (FIG. 2) is machined to size. Optionally the hard turning operation may be employed to size and/or true-up any of the surfaces of the gear body 12 (FIG. 2) that will be abutted against the rotatable member on which the spiral bevel gear 10 (FIG. 2) is to be mounted, such as the annular mounting flange 22 (FIG. 2). The tooth profile 34 (FIG. 3), the bottom land 38 (FIG. 3) and the tooth fillet radius 40 (FIG. 3) are not machined in the hard-turning operation.

The hard-turned intermediate gear 190 can be lapped at the lapping station 114 where the gear teeth 14 are lapped with a spiral bevel pinion gear 200 to form the spiral bevel gear 10. The spiral bevel pinion gear 200 could be a production pinion that is configured to be meshed with the spiral bevel gear 10 in an assembled product, such as an axle assembly (not shown). Alternatively, the spiral bevel pinion gear 200 could be a tool that is meshed with the spiral bevel gear 10 to facilitate the lapping operation. After the lapping operation, the spiral bevel gear 10 and the spiral bevel pinion gear 200 may have a quality level in which they perform at or below a 50 micro-radian level of first harmonic transmission error when positioned in a predetermined spatial relationship. For example, the (spiral bevel) gear teeth of the spiral bevel gear 10 can conform to American Gear Manufacturers Association Standard 2009-B01 and 2011-A98 B8 after the plurality of (spiral bevel) gear teeth of the spiral bevel gear 10 are lapped with the spiral bevel pinion gear 200. Transmission error is the deviation between the actual position of the spiral bevel gear 10 and the position it would occupy if the gearset were perfectly conjugate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A process for manufacturing a spiral bevel gear, comprising:
   providing a forging having a first side and a second side, the first side comprising a plurality of spiral bevel gear teeth, the forging being formed of metal;
   machining the second side of the forging to a predetermined distance from a portion of the spiral bevel gear teeth to form a machined forging;
   without machining the spiral bevel gear teeth, coining the machined forging to induce plastic flow in the spiral bevel gear teeth and cause the spiral bevel gear teeth to conform to a desired tooth profile with a desired degree of accuracy to thereby form a coined gear, wherein each of the spiral bevel gear teeth has a pair of flanks, and wherein the desired tooth profile includes a contour of the flanks of the spiral bevel gear teeth;
   heat-treating the coined gear to form a heat-treated gear;
   machining a portion of the heat-treated gear other than the flanks of the spiral bevel gear teeth to form a heat-treated, machined gear; and
   lapping the spiral bevel gear teeth on the heat-treated, machined gear with spiral bevel pinion gear teeth such that the spiral bevel gear teeth and the spiral bevel pinion gear teeth have a quality level in which they perform at or below a 50 micro-radian level of first harmonic transmission error when positioned in a predetermined spatial relationship.

2. The process of claim 1, wherein the portion of the heat-treated gear that is machined includes a central through-bore.

3. The process of claim 1, wherein the portion of the heat-treated gear that is machined includes the second side.

4. The process of claim 1, wherein prior to coining the machined forging, the method comprises forming a plurality of bolt holes in the forging.

5. The process of claim 4, wherein the bolt holes are at least partly threaded.

6. The process of claim 1, wherein the spiral bevel gear teeth of the forging are used to locate the forging when the second side of the forging is machined.

7. The process of claim 6, wherein each of the spiral bevel gear teeth has a pair of flanks, wherein a locator engages the spiral bevel gear teeth when the forging is located to machine the second side of the forging, and wherein the locator has a plurality of locating elements that are driven into contact with the spiral bevel gear teeth, each of the locators being disposed between a coast side of a first one of an associated adjacent pair of the spiral bevel gear teeth and a drive side of a second one of the associated adjacent pair of the spiral bevel gear teeth.

8. The process of claim 1, wherein the spiral bevel gear is a hypoid gear.

9. The process of claim 1, wherein the spiral bevel gear teeth conform to AGMA 2009-B01 and 2011-A98 B8 after the plurality of spiral bevel gear teeth are lapped with the spiral bevel pinion gear.

10. The process of claim 1, wherein the spiral bevel gear teeth and the spiral bevel pinion gear teeth are meshing hypoid gear teeth that are disposed on a pair of hypoid gears.

* * * * *